Patented Nov. 12, 1929

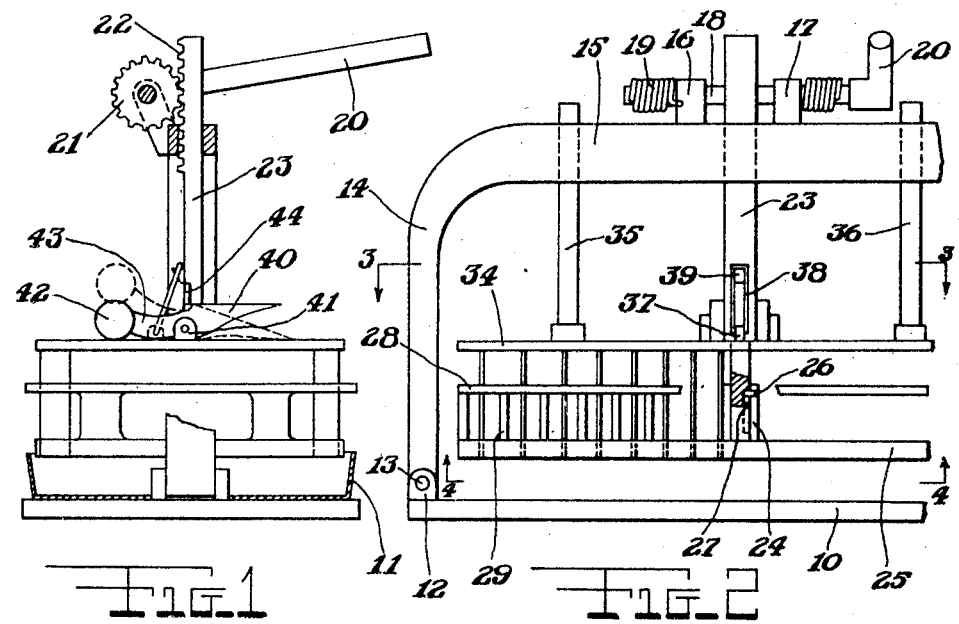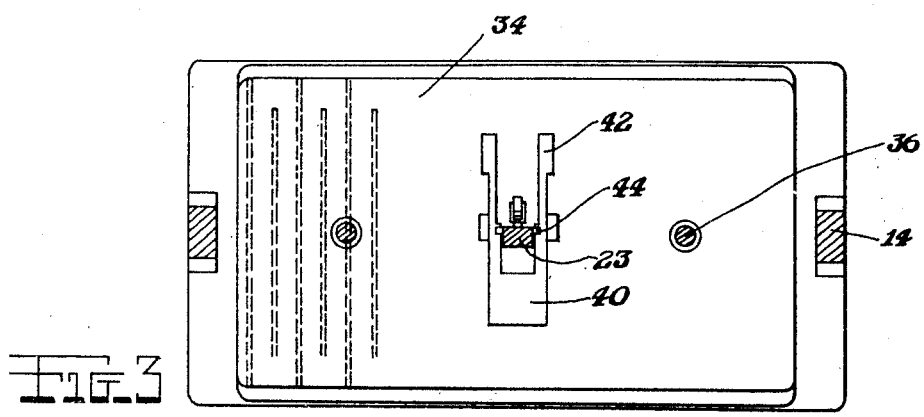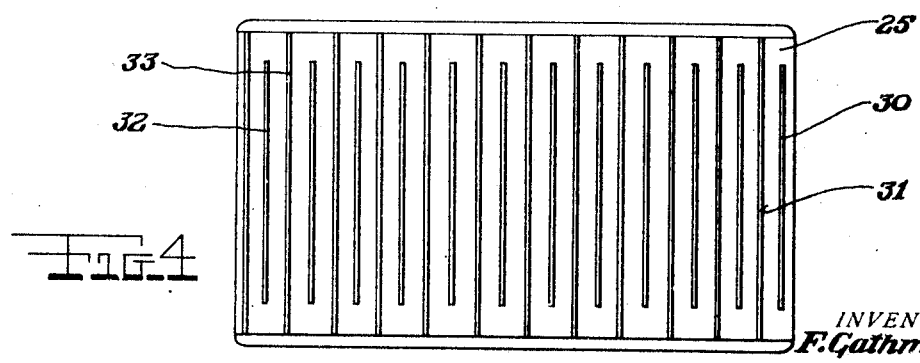

1,735,111

UNITED STATES PATENT OFFICE

FRED GATHMANN, OF RIDGEFIELD, NEW JERSEY

DOUGH-CUTTING MACHINE

Application filed June 12, 1928. Serial No. 284,862.

The main object of this invention is to provide a machine which cuts an expanse of panned dough into strips and forms a slit intermediate the width of the strip. In the making of ring cakes it is customary to coil or twist the dough for appearance sake. The dough strips from which the rings are made could not be coiled or twisted in the prescribed manner unless a slit is provided therein. This machine aims to flatten the dough in a pan and with another operation slit and cut into equal sections said dough which permits its easy forming.

Another object of this invention is to provide a machine hand operated by a lever capable of performing two operations; that of flattening dough deposited in a pan and, with the second operation, lowering knives which cut this dough into sections and slit the sections lengthwise for the forming of ring cakes.

The above and other objects will become apparent in the description below, in which characters of reference refer to like-named parts in the drawing.

Referring briefly to the drawing, Figure 1 is a sectional end elevational view of the dough cutting machine.

Figure 2 is a fragmentary front elevational view of Figure 1.

Figure 3 is a cross sectional plan view taken on line 3—3 of Figure 2.

Figure 4 is a cross sectional view taken on line 4—4 of Figure 2.

Referring in detail to the drawing, the numeral 10 indicates a rectangular platen upon which a dough pan 11 is adapted to be supported. This dough pan rests between ears 12 through which pins 13 pass. The pins support the extremities of a rigid arch 14 whose cross bar 15 has a pair of lugs 16 and 17 extending upwardly and angularly outward therefrom. These lugs journal a spindle 18 which has springs 19 wound about it, the springs serving as a means of recoiling the spindle after a handle lever 20 has been rotated downwardly. The spindle is provided with a pinion 21 which is mounted rigidly thereon. This pinion meshes with the teeth 22 of a rack bar 23. Said rack bar is slidable vertically in an opening in the cross bar 15 of the arch 14 and its lower end is slidably secured in a sleeve 24 which latter projects upwardly from the upper face of a compactor plate 25. This sleeve is provided with a pin 26 which projects into the bore near its upper end and registers in a vertical slot 27 formed in the lower end of the rack bar. Said slot 27 is closed at both ends and limits the independent movement of the compactor plate between the ends of this slot. The compactor plate is surmounted by a frame 28 which has downwardly extending webs 29, the latter connecting the frame to the compactor plate. The frame 28 is greater in area than the compactor plate 25 and both these members (the compactor plate and frame) are provided with parallel adjacently positioned slits 30 and 31. The slits 30 extend parallel to the slits 31 but are of shorter dimension than the latter, this being illustrated in Figure 4. These slits form guide channels for the splitting knives 32 and the longer dividing knives 33. The knives 32 and 33 depend from a knife platform 34 which is movable independently with respect to the compactor plate 25. The knife platform 34 has a pair of studs 35 and 36 extending upwardly therefrom which pass through openings in the connecting bar 15 of the arch 14 and serve as guide means for this knife platform. The knife platform is provided with an ear 37 adjacent the rack bar 23 in which one end of a link 38 is rotatably journaled. This link 38 serves as a hook when it is desired to suspend the knife platform from a hang lug 39 mounted on the rack bar to retain the lower active ends of the knives 32 and 33 flush with the surface of the compactor plate 25. A rack bar latching means is provided so that after the compactor bar rests upon the surface of the dough in the pan 14 the knives can be depressed and cut and slit the dough. This latch comprises a triangular channel member 40 which is pivotally secured between ears 41 and, when resting in the position shown in Figure 1, communicates with the counterweight 42 at the ends of the arms 43. The surface of the latch engages projections 44 on the rack bar 23 and retain this rack bar raised a distance of the width of the latch above the knife platform 34.

In use the knife platform 34 and the compactor plate 25 with its frame 28 are raised as a unit by the upward rotation of the handle bar 20. This movement is continued until sufficient space exists between the compactor plate 25 and the platen 10 to permit the insertion of a pan 11 filled or partly filled with dough beneath the compactor plate 25. The dough, usually of a leavened variety, when prepared for ring cakes must be slitted and made compact. Compacting this dough in the pan is accomplished by lowering member 20. This causes the pinion 21 to rotate and said pinion, engaging with the rack bar 23 lowers the latter. The lower end of the rack bar being housed in the sleeve 24 depresses the compactor plate until the latter firmly comes to rest upon the dough. The next operation of cutting the dough into strips and slitting these strips then occurs. This is accomplished by releasing the link 38 from engagement with member 39, freeing the knives and knife platform 34. The latch 40 is then tilted from the position shown in dotted lines in Figure 1 to full shown in full lines in the same figure, after the rack bar has been raised, in order to lift the projections 44 above the latch. Lowering of member 20 is then repeated with the result that the knives 32 and 33 pass through guide slits 30 and 31 and into the dough, the long knives 33 cutting this expanse of dough into strips and the shorter knives 32 slitting these strips intermediate their width.

It is to be noted that certain changes in form and construction may be made without departing from the spirit and scope of the invention.

I claim:

1. In a device of the class described, a compactor plate adapted to be raised and lowered, a knife platform, knives depending from said platform, a rack bar for lowering said knife platform and compactor plate, a link pivotally attached to said knife platform, a lug on said rack bar adapted to engage said link and hang said knife platform from said rack bar, means for raising said rack bar without disturbing said compactor plate, a tiltable latch mounted on said knife platform adapted to retain said rack bar raised a distance above said knife platform, said latch when so positioned and when said rack bar is depressed being adapted to extend said knives through said compactor plate.

2. In a device of the class described, a compactor plate adapted to be raised and lowered, a knife platform, knives depending from said platform, a rack bar for lowering said knife platform and compactor plate, a link pivotally attached to said knife platform, a lug on said rack bar adapted to engage said link and hang said knife platform from said rack bar, a sleeve on said compactor plate, said rack bar registering in said sleeve, a pin projecting into the bore of said sleeve, said rack bar having a slot therein, said pin entering said slot, said slot and pin being adapted to permit partial raising of said rack bar without disturbing of said said compactor plate.

In testimony whereof I affix my signature.

FRED GATHMANN.